(12) United States Patent
Marques et al.

(10) Patent No.: US 7,417,947 B1
(45) Date of Patent: Aug. 26, 2008

(54) ROUTING PROTOCOL FAILOVER BETWEEN CONTROL UNITS WITHIN A NETWORK ROUTER

(75) Inventors: Pedro R. Marques, Santa Clara, CA (US); Steven Lin, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 634 days.

(21) Appl. No.: 11/029,271

(22) Filed: Jan. 5, 2005

(51) Int. Cl.
*H04L 1/00* (2006.01)

(52) U.S. Cl. ........................ 370/220; 370/238
(58) Field of Classification Search .......... None
See application file for complete search history.

(56) References Cited

U.S. PATENT DOCUMENTS

| | | | |
|---|---|---|---|
| 6,327,243 B1 * | 12/2001 | Gregorat ............. | 370/218 |
| 6,421,741 B1 * | 7/2002 | Minyard ............. | 713/375 |
| 6,628,649 B1 * | 9/2003 | Raj et al. ............. | 370/360 |
| 6,968,401 B2 * | 11/2005 | McBrearty et al. ....... | 710/38 |
| 6,999,411 B1 | 2/2006 | Brewer et al. | |
| 7,234,001 B2 | 6/2007 | Simpson et al. | |
| 2002/0067704 A1 | 6/2002 | Ton | |
| 2002/0169794 A1 | 11/2002 | Jones et al. | |
| 2003/0046604 A1 | 3/2003 | Lau et al. | |
| 2004/0078619 A1 | 4/2004 | Vasavada | |
| 2004/0078625 A1 | 4/2004 | Rampuria et al. | |
| 2004/0083403 A1 | 4/2004 | Khosravi | |
| 2005/0021844 A1 | 1/2005 | Puon et al. | |
| 2005/0060427 A1 | 3/2005 | Phillips et al. | |
| 2005/0193229 A1 | 9/2005 | Garg et al. | |
| 2005/0281191 A1 * | 12/2005 | McGee et al. ............. | 370/216 |
| 2005/0283529 A1 * | 12/2005 | Hsu et al. ............. | 709/224 |
| 2006/0092940 A1 | 5/2006 | Ansari et al. | |
| 2006/0256767 A1 * | 11/2006 | Suzuki et al. ............. | 370/351 |

OTHER PUBLICATIONS

U.S. Patent Application entitled "Selective Replay of State Information Within a Computing Device," U.S. Appl. No. 10/807,823, filed Mar. 24, 2004.

* cited by examiner

*Primary Examiner*—Andrew Lee
(74) *Attorney, Agent, or Firm*—Shumaker & Sieffert, P.A (57) ABSTRACT

A device includes a primary control unit and a standby control unit. The standby control unit records routing communications exchanged between the primary control unit and an external routing device in accordance with a routing protocol. A standby routing process executing on the standby control unit processes the recorded routing communications when the primary control unit fails. The standby routing process generates state information for executing the routing protocol on the standby control unit without requiring that routing sessions be reestablished with the external routing device.

33 Claims, 6 Drawing Sheets

ROUTING PROTOCOL FAILOVER BETWEEN CONTROL UNITS WITHIN A NETWORK ROUTER

TECHNICAL FIELD

The invention relates to computing environments and, more particularly, to network routing devices.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" via which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing communication session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and one or more secondary routing control units. In the event the primary routing control unit fails, one of the secondary routing control units assumes routing responsibilities. In some situations, the failed router may support "non-stop forwarding," which refers to the ability to continue forwarding packets while the routing session is reestablished. Redundant components in the failed router maintain forwarding state information during control module failure, enabling the failed router to continue forwarding packets over routes that were available in the network's last-known state. As a result, impact on current packet flows through the network may be reduced.

However, routing functionality is not restored within the failed router until the secondary routing control unit reestablishes the failed routing communication sessions. Specifically, the secondary routing control unit must establish the routing communication sessions, relearn the network topology including any updates that have occurred since failure of the primary routing control unit, and recalculate its routing information and forwarding information. This process may take a significant period of time. For example, the secondary routing control unit may need to establish a significant number of routing communication sessions, e.g., BGP sessions, that were lost when the primary routing control unit failed. Further, typical routing protocols place significant demands on the router in terms of generating and maintaining state information associated with each routing protocol.

As a result, the failed router is unable to respond to network topology changes that occur during this recovery period. This lengthy delay in reestablishing routing functionality with the secondary routing control unit may result in sub-optimal forwarding decisions. In certain situations, the inability to respond to topology changes may lead to packets being delayed or dropped entirely.

SUMMARY

In general, techniques are described for reducing the impact of failover within a network router having multiple control units, e.g., a primary control unit and at least one standby control unit. More specifically, a standby control unit transparently monitors inbound and outbound routing communications between with the primary control unit and one or more routing peers for one or more routing protocols. The standby control unit maintains a database that records the routing communications received by the primary control unit as well as routing communications produced by the primary control unit. In this manner, the database can be viewed as synchronized with the routing communications sent over a network with respect to one or more routing protocols.

In the event of a failover, the standby control unit utilizes the recorded routing communications to calculate state information for the routing protocols. In other words, the standby control unit makes routing decisions in a manner similar to those previously made by the failed primary control unit. During this process, the standby control unit generates a set of outbound routing communications that would normally be sent to the external routing peers. The standby control unit compares the set of outbound routing communications with the recorded routing communications actually sent by the failed primary router to determine if any differences exist between the standby control unit and the routing peers. Based on the determination, the standby control unit generates a set of incremental routing update messages to reconcile the standby control unit and the routing peers for each of the routing protocols.

The described techniques may allow the standby control unit to maintain routing sessions that were previously established by the failed primary control unit without needing to reestablish the routing sessions. As a result, the amount of time necessary to reestablish routing functionality with the secondary control unit may be reduced or even eliminated, thereby allowing the secondary control unit to more quickly respond to network topology changes.

In this manner, the standby control unit may maintain the routing sessions after failover without requiring that complete routing protocol state information associated with the routing protocols be replicated from the primary control unit to the standby control unit prior to failover. Consequently, the techniques may avoid the significant overhead that may otherwise be incurred in replicating complete routing protocol state information between the primary control unit and the standby control unit prior to failover.

In one embodiment, a method comprises monitoring routing communications between a primary control unit of a routing device and an external routing device for a routing protocol, and recording the routing communications with a standby control unit of the routing device. The method further comprises processing the recorded routing communications with the standby control unit when the primary control unit fails in order to generate state information for executing the routing protocol on the standby control unit.

In another embodiment, a device comprises a primary control unit, and a standby control unit that records routing communications exchanged between the primary control unit and an external routing device in accordance with a routing protocol.

In another embodiment, a computer-readable medium comprises instructions to cause a processor within a standby control unit of a router to record inbound and outbound routing communications between a primary control unit of a routing device and an external routing device for a routing protocol. The instructions further cause the processor to, upon detecting failure of a primary control unit, process the recorded routing communications with the standby control unit to generate state information for executing the routing protocol on the standby control unit, and output a set of routing protocol update communications to the external routing device to synchronize the standby routing device and the external routing device with respect to the routing protocol.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
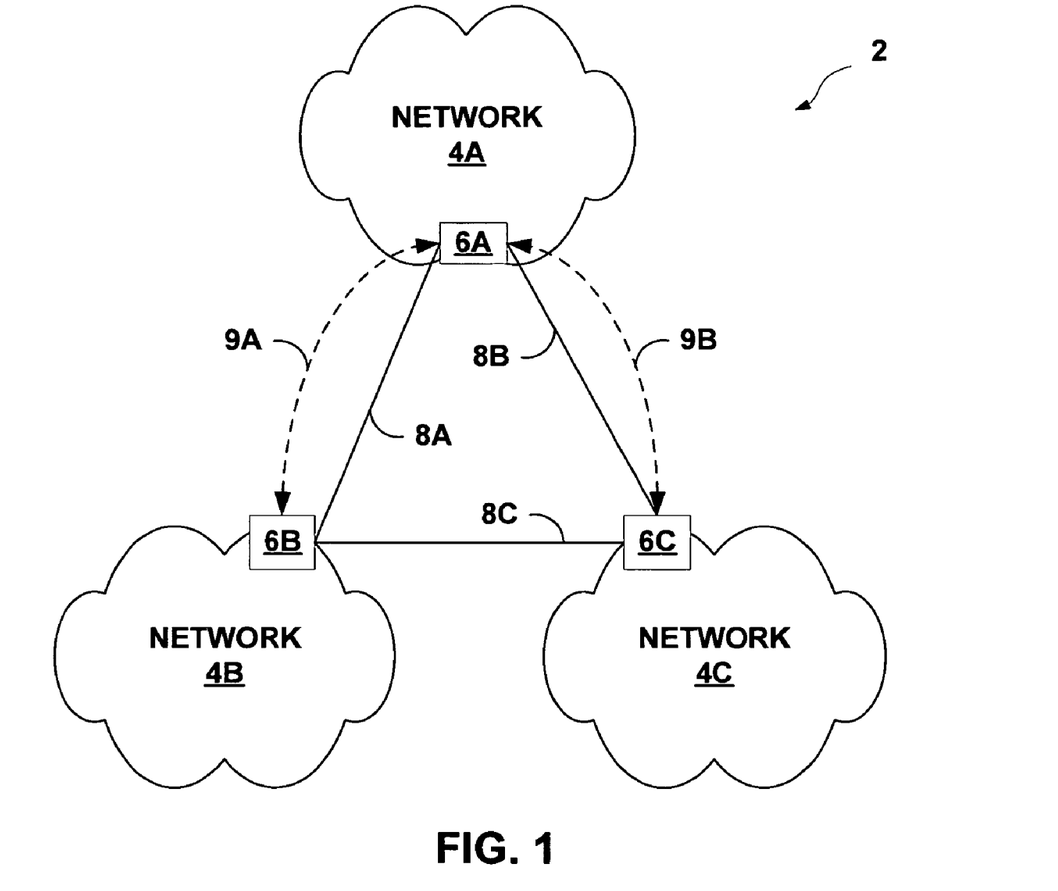
FIG. 1 is a block diagram illustrating an exemplary network environment.

FIG. 1 is a block diagram that illustrates an exemplary computing environment 2 formed by networks 4A-4C ("networks 4") interconnected via communication links 8. In general, each of networks 4 represents a variety of networked resources capable of packet-based communication. For example, networks 4 may include servers, workstations, network printers and faxes, gateways, routers, or other network-enabled devices.

In this example, networks 4 include routers 6A-6C ("routers 6") for sharing routing information and forwarding packets via physical communication links 8A-8C ("communication links 8"). More specifically, routers 6 maintain routing sessions 9A and 9B ("routing sessions") (shown as dotted arrows in FIG. 1) for exchanging routing information representative of the topology of computing network 2 via one or more routing protocols. For example, routers 6 may maintain routing sessions 9 for the Border Gateway Protocol (BGP), the Label Distribution Protocol (LDP), the Intermediate System to Intermediate System (ISIS) protocol, the Open Shortest Path First (OSPF) protocol, the Routing Information Protocol (RIP) or other routing protocols.

In accordance with the principles of the invention, router 6A provides for failover by including a primary control unit and at least one standby control unit (not shown in FIG. 1). In the event the primary control unit fails, the standby control unit assumes control over routing resources and routing functionality generally.

Prior to failure, the standby control unit monitors inbound and outbound routing communications between with the primary control unit of router 6A and routers 6B, 6C for routing sessions 9. More specifically, the standby control unit maintains a database (not shown in FIG. 1) that reflects the most recent state of routing communications received by the primary control unit as well as routing communications produced by the primary control unit for each of the routing sessions 9.

In the event of a failover, the standby control unit utilizes the recorded routing communications to calculate any additionally needed state information for the routing protocols. The standby control unit then determines if any differences exist between the standby control unit and routers 6B and 6C for any of the routing protocols. As one example, when regenerating the additional state information, the standby control unit determines the set of attributes associated with a set of outbound routing communications (e.g., update messages) that would normally be communicated to routers 6B and 6C. Instead of outputting the set of routing communications, the standby control unit compares the determined attributes with the recorded routing communications previously sent by the primary control unit.

Based on the determination, the standby control unit outputs a set of incremental routing update messages to reconcile the standby control unit with routers 6B and 6C for each of the routing protocols. The standby control unit communicates the update messages to routers 6B and 6C by way of sessions 9, thereby synchronizing the current state of the routing protocols for routers 6.

The described techniques may allow the standby control unit of router 6A to maintain routing sessions 9 that were previously established by the failed primary control unit without needing to reestablish the routing sessions 9, which may be a time-consuming task. As a result, the amount of time necessary to reestablishing routing functionality with the secondary control unit may be reduced or even eliminated, thereby allowing the secondary control unit to quickly respond to network topology changes.

Moreover, the standby control unit may maintain routing sessions 9 after failover without requiring that complete routing protocol state information associated with the routing protocols be replicated from the primary control unit to the standby control unit prior to failover. Consequently, the techniques avoid the significant overhead that may otherwise be incurred in replicating complete routing protocol state information between the primary control unit and the standby control unit prior to failover.

Conditions that may lead to failover include software, hardware, or firmware failure, or combinations thereof. Another type of failover includes "in service software upgrades" during which a primary control unit is intentionally taken offline to perform a software upgrade.

For exemplary purposes, the principles of the invention will be described in reference to router 6A. However, any or all of routers 6B-6C may operate in accordance with the techniques described herein. Moreover, routers 6 may exist in a single network, and need not be located in separate networks 4, as illustrated in FIG. 1. The techniques may readily be applied to any network device, having at least one standby unit, that implements routing functionality, such as a core router, an edge or access router, an enterprise router or other device.

Figure 2:
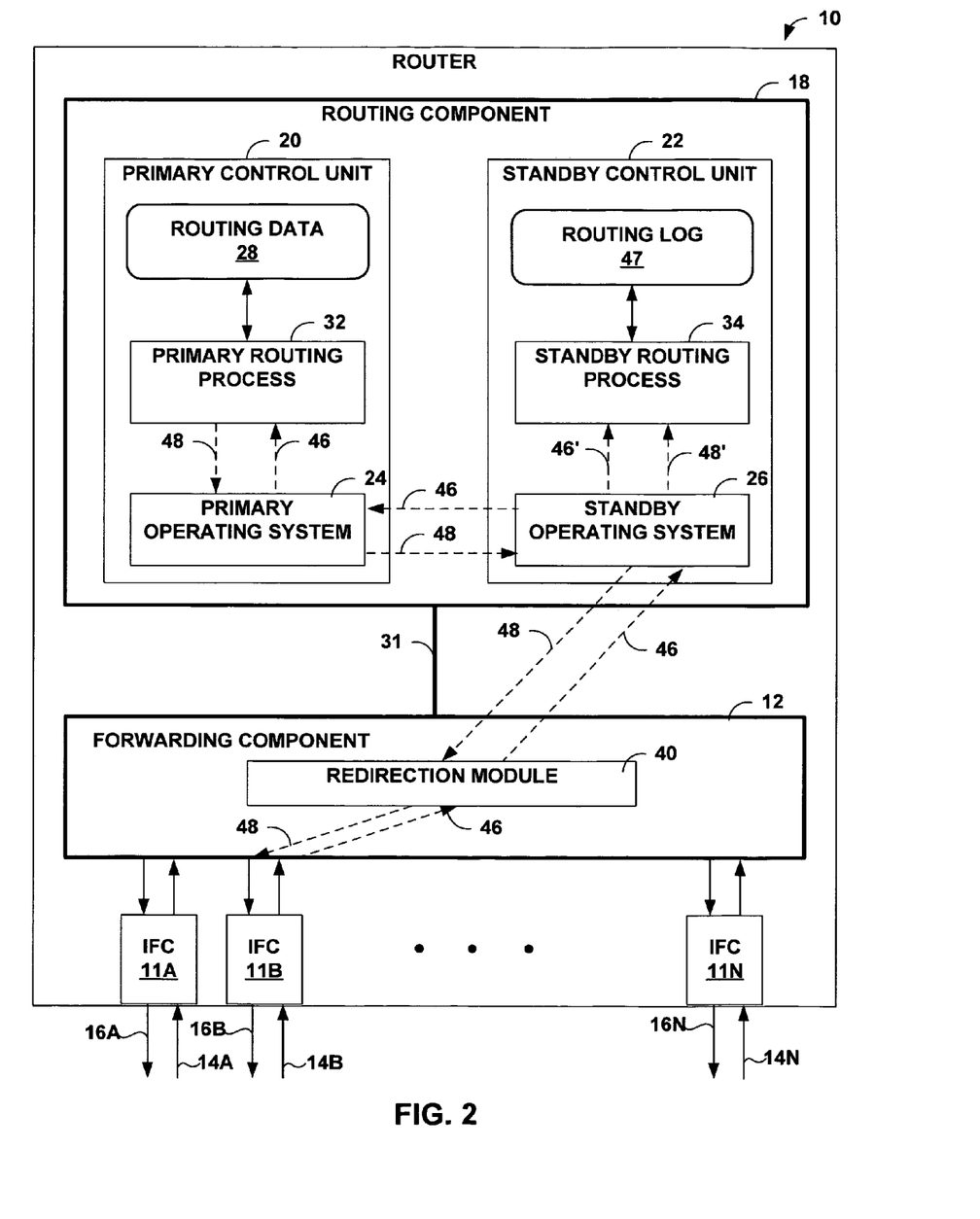
FIG. 2 is a block diagram illustrating an example router consistent with the principles of the invention.

FIG. 2 is a block diagram illustrating an example embodiment of router 10 consistent with the principles of the invention. In the exemplary embodiment, router 10 includes a routing component 18 having a primary control unit 20 and a standby control unit 22. Primary control unit 20 and standby control unit 22 may be substantially similar in both hardware and software aspects. For example, both primary control unit 20 and standby control unit 22 may comprise similar combinations of programmable processors. Moreover, as illustrated in FIG. 2, both primary control unit 20 and standby control unit 22 may execute similar software processes, such as primary operating systems 24, standby operating system 26, primary routing process 32 and standby routing process 34.

Primary operating system 24 executing on primary control unit 20 may provide a multi-tasking operating environment for execution of a number of software processes, such as primary routing process 32. In like manner, standby operating system 26 executing on standby control unit 22 may also provide a multi-tasking operating environment for execution of a number of software processes, such as standby routing process 34. An exemplary operating system capable of this is FreeBSD, which is an advanced UNIX operating system that is compatible with a number of programmable processors.

Primary routing process 32 maintains routing data 28 that describes the topology of a network, such as computing environment 2 of FIG. 1, and, in particular, routes though the network. Routing data 28 may include, for example, route data that describes various routes within the network, and corresponding next hop data indicating appropriate neighboring devices within the network for each of the routes. Primary control unit 20 updates routing data 28 to accurately reflect the topology of the network.

Primary control unit 20 and standby control unit 22 are coupled to a forwarding component 12 via high-speed interconnect 31, which may comprise a high-speed network, switch fabric or other communication means. Forwarding component 12 is further coupled to a set of interface cards (IFCs) 11A-11N ("IFCs 11") for sending and receiving packets via network links 14A-14N ("network links 14") and 16A-16N ("network links 16"). In particular, forwarding component 12 receives inbound packets from network links 14 via IFCs 11, determines destinations and associated next hops for the packet in accordance with routing data 28 and outputs the packets on network links 16 based on the determined next hops. In some embodiments, forwarding component 12 may forward the packets in accordance with forwarding information generated by primary routing process 32 based on routing data 28.

In general, primary routing process 32 maintains routing protocol sessions with one or more network peers, and updates routing data 28 based on routing advertisements received from the peers. Consistent with the principles of the invention, standby control unit 22 monitors and records inbound and outbound routing communications between primary control unit 20 and the network peers.

In particular, as illustrated in FIG. 2, forwarding component 12 includes redirection module 40 that redirects inbound routing communications 46 destined for primary control unit 20 to standby control unit 22. More specifically, upon receiving an inbound routing communication 46 via any of IFCs 11, redirection module 40 forwards the inbound routing communication 46 to standby control unit 22 instead of forwarding the routing communication to primary control unit 20.

Standby operating system 26 receives inbound routing communications 46 from forwarding component 12, and forwards the inbound routing communications to primary control unit 20 for processing and updating routing data 28. In particular, primary routing process 32 typically updates routing data 28 to maintain state information for the supported routing protocols, and may apply path selection algorithms to select paths through the network based on information such as the state information and the advertised routes.

In addition, standby operating system 26 outputs a duplicate packet stream 46' of the inbound routing communications to standby routing process 34. Standby routing process 34 receives the duplicate packet stream 46' and updates routing log 47 to record inbound routing communications 46 and, in particular, routing advertisements specified within the inbound routing communications.

Similarly, primary operating system 24 receives outbound routing communications 48 generated by primary routing process 32. Instead of forwarding outbound routing communications 48 to forwarding component 12, primary operation system 24 redirects outbound routing communications 48 to standby control unit 22. Standby operating system 26 forwards the outbound routing communications 48 to forwarding component 12, and outputs a duplicate packet stream 48' to standby routing process 34. Standby routing process 34 receives the duplicate packet stream 48' and updates routing log 47 to record routing advertisements specified within outbound routing communications 48.

In this manner, inbound and outbound routing communications 46 and 48, respectively, are directed through standby control unit 22, thereby ensuring that routing log 47 is synchronized with the routing advertisements present "on the wire," i.e., the routing advertisements and other information communicated between primary control unit 22 and its routing peers.

In the event of a failover, standby routing process 34 assumes primary routing responsibilities for router 10, and utilizes the advertisements recorded in routing log 47 to quickly generate any additional state information and routing data (not shown in FIG. 2) for the supported routing protocols. In other words, standby routing process 34 generates routing data (not shown) similar to routing data 28. Standby routing process 34 then compares the newly generated routing protocol data with the information recorded in routing log 47 to determine if any differences (e.g., topology differences) exist between router 10 and its peers for any of the routing protocols. Based on the determination, standby routing process 34, acting as the primary routing process, outputs a set of incremental routing update messages to reconcile the newly generated routing data and the routing data maintained by the peers for each of the routing protocols. Standby routing process 34 communicates the update messages by way of forwarding component 12, thereby synchronizing the current state of the routing protocols and eliminating the need to reestablish routing sessions.

Each of primary control unit 20 and standby control unit 22 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of router 10 may be implemented by executing the instructions of the computer-readable medium with one or more processors, discrete hardware circuitry, firmware, software executing on a programmable processor, or combinations thereof.

Figure 3:
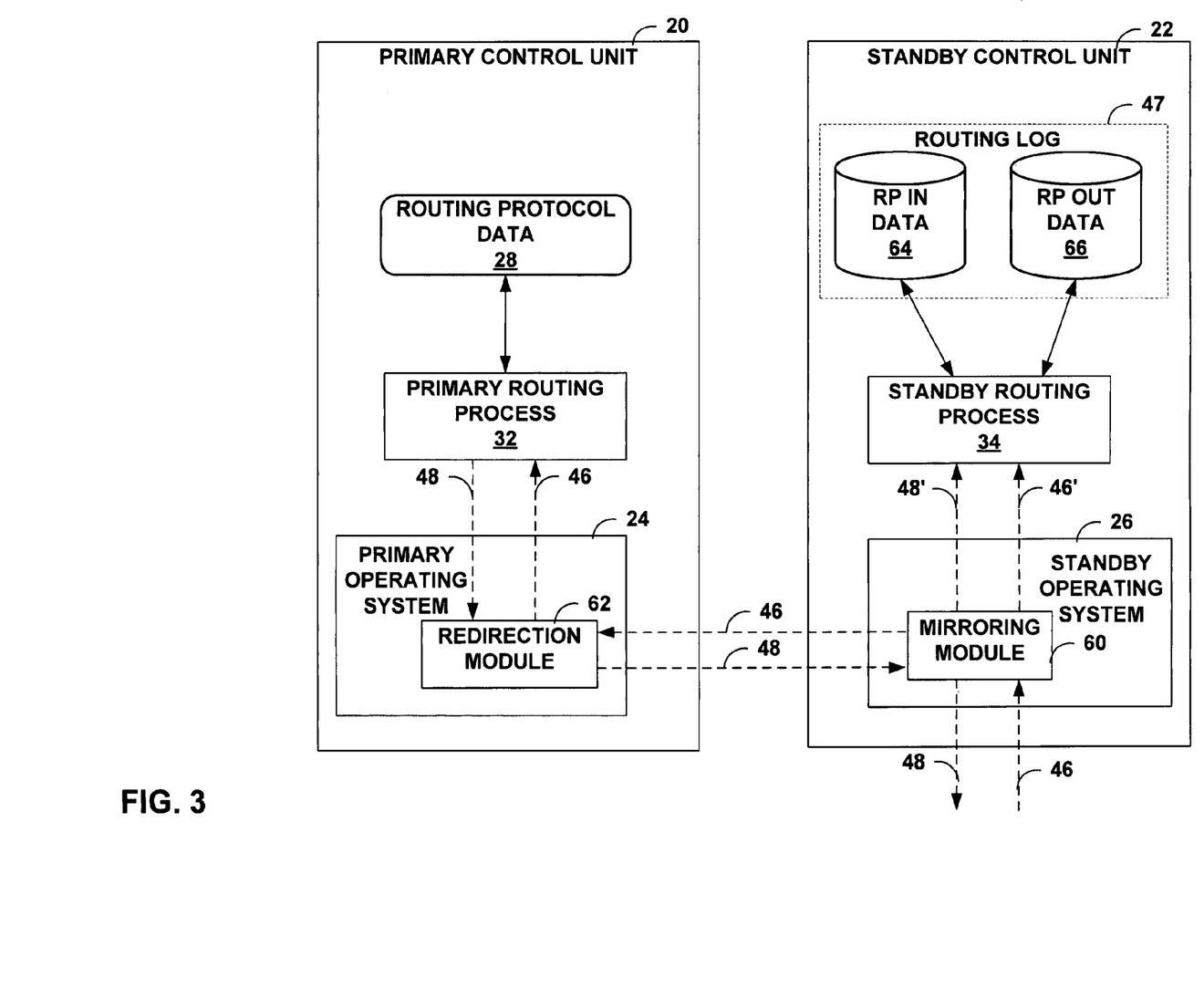
FIG. 3 is a block diagram illustrating a portion of the router in further detail.

FIG. 3 is a block diagram illustrating a portion of router 10 (FIG. 2) in further detail. In particular, FIG. 3 illustrates the exemplary components of primary control unit 20 and standby control unit 22 in further detail.

In the illustrated example, standby operating system 26 includes mirroring module 60 that receives inbound routing communications 46 from forwarding component 12 (FIG. 3). Mirroring module 60 generates a duplicate packet stream 46' of the inbound routing communications 46, and outputs the duplicate packet stream to standby routing process 34.

Standby routing process 34 receives the duplicate packet stream 46' and updates routing log 47 to include routing advertisements specified within inbound routing communications 46. As shown in FIG. 3, routing log 47 includes "RP IN" data 64 that represents routing advertisements sent to primary control unit 20 by peer routers. In other words, RP IN data 64 represents routing advertisements learned via inbound routing communications 46. Standby routing process updates RP IN data 64 to record the routing advertisements conveyed via inbound routing communications 46.

In addition, mirroring module 60 forwards the inbound routing communications 46 to primary control unit 20 for processing and updating routing data 28. In particular, mirroring module 60 forwards the inbound routing communications 46 to redirection module 62 of primary operating system 24, which is configured to receive the routing communications and forward the routing communications to primary routing process 32.

Primary routing process 32 updates routing data 28 to reflect the advertised routes learned via inbound routing communications 46, and generates state information for the supported routing protocols. During this process, primary routing process 32 may apply path selection algorithms to select paths through the network based on the state information.

At any point in time, primary routing process 32 may generate outbound routing communications 48 for one or more of the routing protocols. Redirection module 62 of primary operating system 24 receives outbound routing communications 48 generated by primary routing process 32. Instead of forwarding outbound routing communications 48 to forwarding component 12, redirection module 62 redirects outbound routing communications 48 to standby control unit 22.

Mirroring module 60 of standby operating system 26 outputs a duplicate packet stream 48' to standby routing process 34. Standby routing process 34 receives the duplicate packet stream 48' and updates routing log 47 to include routing advertisements specified within outbound routing communications 48. As shown in FIG. 3, routing log 47 includes "RP OUT" data 66 that represents routing advertisements sent by primary control unit 20 to other peer routers. In other words, RP OUT data 66 represents routing advertisements conveyed by primary routing process 34 via outbound routing communications 48, and represents the state of the primary routing process that is "known" to the peer. Standby routing process updates RP OUT data 66 to record the routing advertisements conveyed via outbound routing communications 48. Mirroring module 60 forwards the outbound routing communications 48 to forwarding component 12 (FIG. 2) for communication to the network peers.

Figure 4:
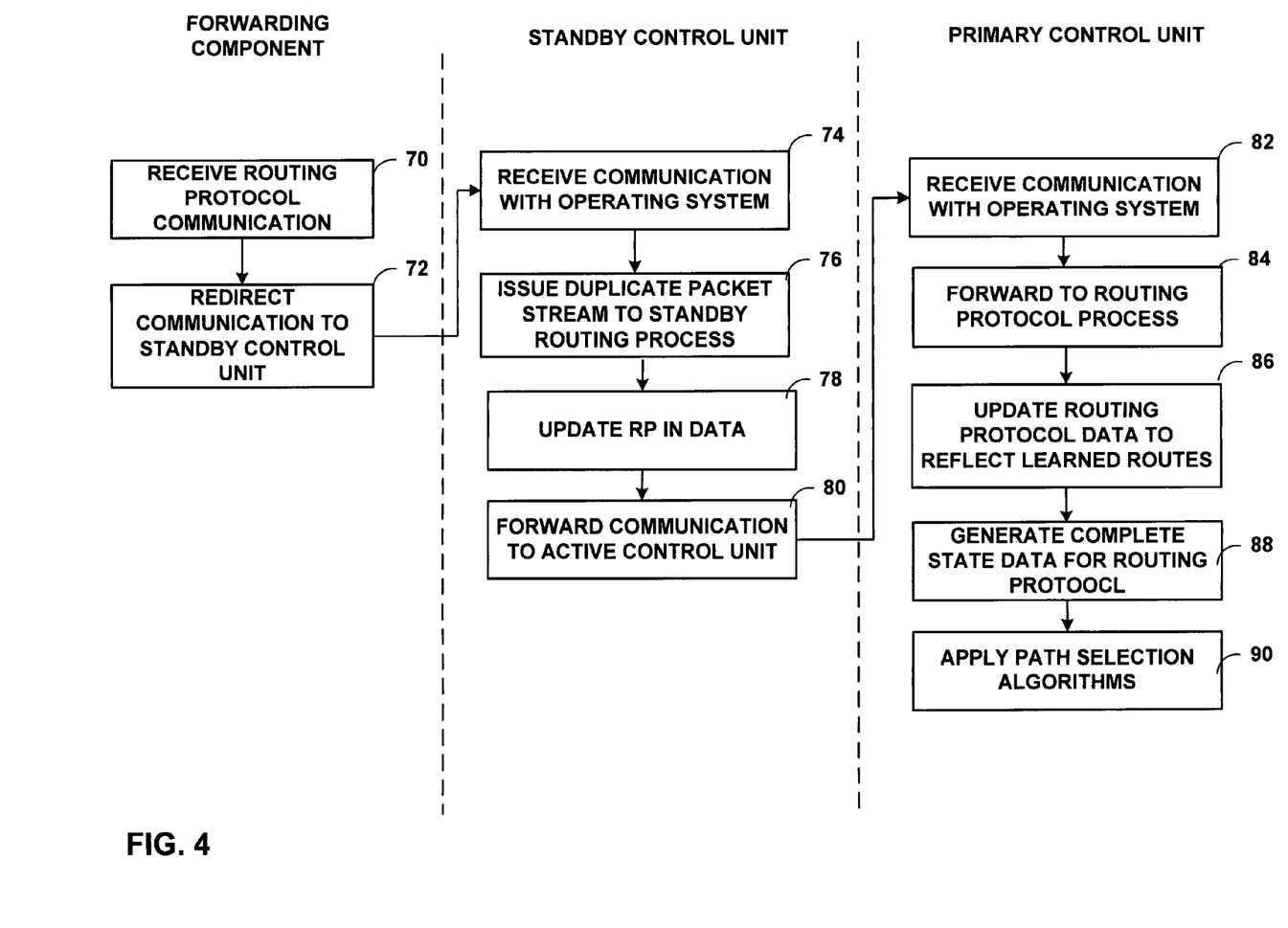
FIG. 4 is a flowchart illustrating exemplary operation of the router in processing inbound routing communications with the principles of the invention.

FIG. 4 is a flowchart illustrating exemplary operation of router 10 (FIGS. 2-3) in processing an inbound routing communication 46. Initially, forwarding component 12 receives inbound routing communication 46 (70) from a network peer (e.g., another routing device) via one of IFCs 11. Forwarding component 12 receives inbound routing communication 46 in the form of one or more packets, and identifies primary control unit 20 as a destination for the packets consistent with routing data 28.

Instead of forwarding inbound routing communication 46 directly to primary control unit 20, redirection module 40 redirects the packets to standby control unit 22 (72). In one exemplary embodiment, redirection module 40 applies a label or header to associate the packets with standby control unit 22, and outputs the packets on high-speed interconnect 31. In this fashion, redirection module 40 redirects inbound routing communication 46 to standby control unit 22 even though the packets are destined for primary control unit 20.

Standby operating system 26 receives inbound routing communication 46 from forwarding component 12 (74). Specifically, standby operating system 26 receives the one or more packets corresponding to inbound routing communication 46, and buffers the packets for forwarding to primary control unit 20. Mirroring module 60 generates a duplicate packet stream 46' from the buffered packet, and outputs the duplicate packet stream to standby routing process 34 (76). Standby routing process 34 operating within standby control unit 22 receives duplicate packet stream 46' and updates RP IN data 64 of routing log 47 to include routing advertisements specified within inbound routing communications 46 (78).

Mirroring module 60 also forwards the original packets to primary control unit 20 (80). Mirroring module 60 may, for example, update the label or header within each packet to associate the packet with primary control unit 20, and then forward the packets to the primary control unit via high-speed interconnect 31. This process may occur in parallel with, prior to or subsequent from the generation of duplicate packet stream 46'.

Redirection module 62 of primary operating system 24 receives inbound routing communication 46 (82) and forwards the routing communications to primary routing process 32 (84). Primary routing process 32 updates routing data 28 to reflect the routes learned via inbound routing communications 46 (86), and generates state information for the supported routing protocols (88). During this process, primary routing process 32 may apply path selection algorithms to select paths through the network based on the state information (90).

Figure 5:
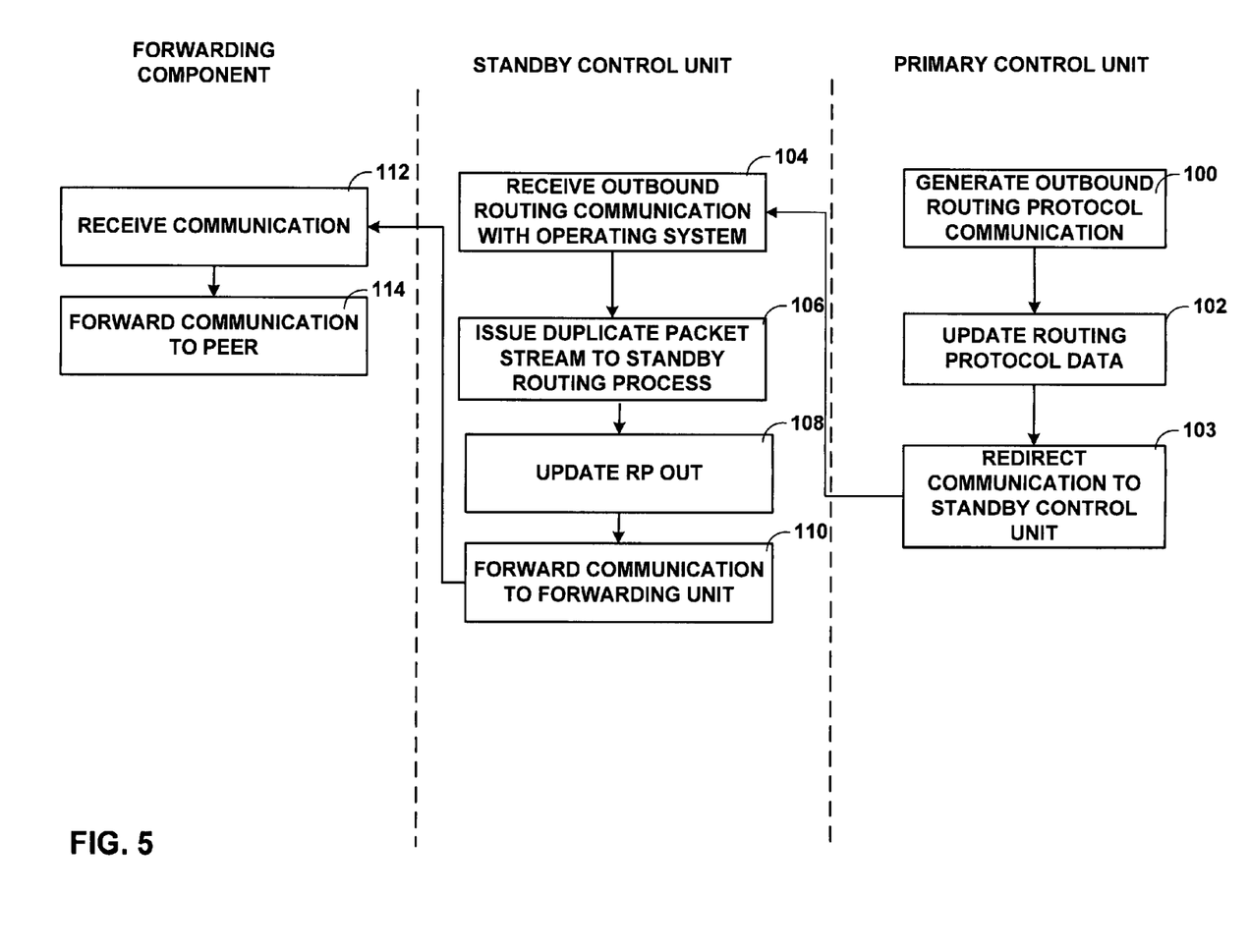
FIG. 5 is a flowchart illustrating exemplary operation of the router in processing outbound routing communications consistent with the principles of the invention.

FIG. 5 is a flowchart illustrating exemplary operation of router 10 (FIGS. 2-3) in processing outbound routing communications 48. Initially, primary routing process 32 generates an outbound routing communication 48 for a specific routing protocol (100). One example of an outbound routing communication is a BGP UPDATE message that lists routes recently learned or withdrawn by primary routing process 32. To output the message, primary routing process 32 typically utilizes one or more kernel calls to pass data to primary operating system 24 to be communicated via one or more messaging sockets associated with the routing protocols. During this process, primary routing process 32 updates routing data 28 and, in particular, the protocol state data to reflect the current state of the routing protocol (102).

Redirection module 62 of primary operating system 24 receives outbound routing communication 48 from primary routing process 32. Instead of forwarding outbound routing communications 48 to forwarding component 12, redirection module 62 redirects outbound routing communication 48 to standby control unit 22 (103). In one exemplary embodiment, redirection module 62 generates outbound routing communication 48 as one or more packets carrying the data received from primary routing process 32. Redirection module 62 assigns a header or label to the packets to specify the standby control unit 22, and outputs the packets on high-speed interconnect 31. In this fashion, redirection module 62 redirects outbound routing communication 48 to standby control unit 22.

Standby operating system 26 of standby control unit 22 receives outbound routing communication 48 (104). Standby operating system 26 may, for example, receive outbound routing communication 48 in the form of one or more packets from high-speed interconnect 31 via a network interface. Mirroring module 60 of standby operating system 26 outputs a duplicate packet stream 48' to standby routing process 34 (106).

Standby routing process 34 receives duplicate packet stream 48' and updates RP OUT 66 of routing log 47 to include routing advertisements specified within outbound routing communications 48 (108). In one embodiment, standby routing process 34 does not generate protocol state information or apply path selection algorithms, but instead records the advertised routes specified within outbound routing communication 48. Instead of recording actually copies of each message, standby routing process 34 may maintain a current record of the attributes specified by the messages.

Mirroring module 60 forwards the outbound routing communication 48 to forwarding component 12 for output to the respective routing peer (110). Mirroring module 60 outputs the packets that form outbound routing communication 48 to forwarding component 12 on high-speed interconnect 31. Forwarding component 12 receives the packets (112) and, based on the destination address, forwards the packets on one of IFCs 11 consistent with routing data 28.

Figure 6:
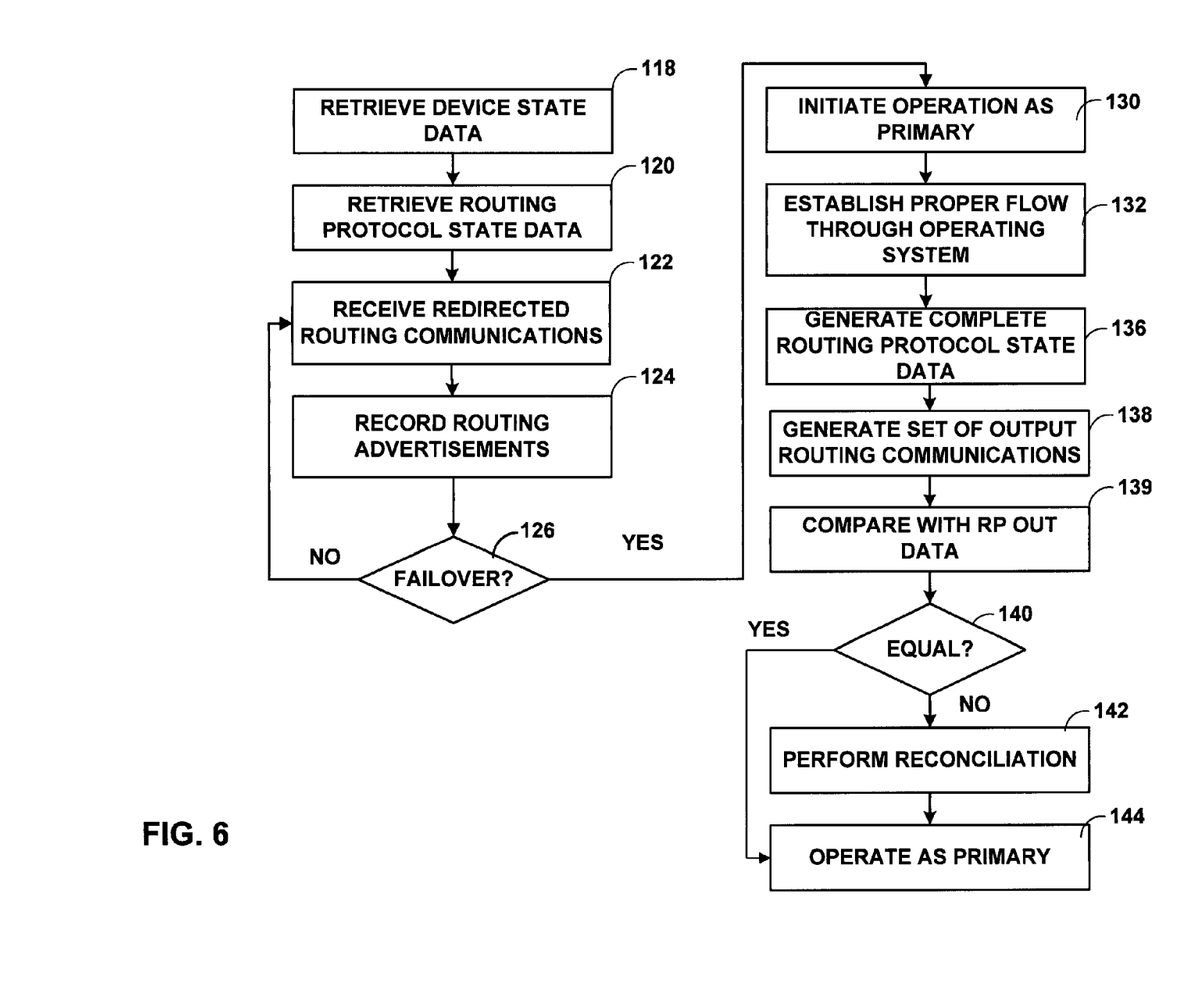
FIG. 6 is a flowchart illustrating exemplary operation of a standby control unit consistent with the principles of the invention.

FIG. 6 is a flowchart further illustrating exemplary operation of standby control unit 22 (FIGS. 2-3). Upon initial power-up, standby control unit 22 may communicate with primary control unit 20 to retrieve a "snap shot" of current device state information (118) and routing protocol state information (120). Examples of device state information include state information for IFCs 11, forwarding component 12 or other components of router 10.

The retrieved routing state information provides baseline state information for the routing protocols supported by router 10. Upon failover, as described in further detail below, standby control unit 22 utilizes the baseline state information and the recorded routing advertisements to generate additional state information for the routing protocol. In this manner, standby control unit 22 need not be completely synchronized with primary control unit 20 with respect to the routing protocols, yet the standby control unit may assume primary routing functions upon a failover without needed to reestablish currently active routing sessions.

Upon retrieving the state information and after performing any other initialization operations, standby control unit 22 operates in a standby mode during which the standby control unit processes redirected inbound and outbound routing communications 46, 48 and records the communications in routing log 47 (122, 124).

In the event of a failover, i.e., a failure of primary control unit 20 (126), standby control unit 22 switches modes and initiates operation as the primary routing controller (130). During this process, standby control unit 22 establishes a communication flow from standby routing process 34 through standby operating system 26 to forwarding component 12 (132). For example, standby operating system 26 may temporarily reconfigure or disable mirroring module 60 so that inbound routing communications are forwarded directly to standby routing process 34, which is now acting as the primary routing process. Similarly, standby operating system 26 forwards any outbound routing communications originating from standby routing process 34 directly to forwarding component 12 for forwarding to peers.

In addition, standby routing process 34 processes the routing advertisements recorded RP IN 64 and RP OUT 66 in view of the original snapshot of protocol state information collected from primary routing process 32 in order to regenerate additional state information for the routing protocols supported by router 10 (136). During this process, standby routing process 34 rebuilds the routing data representative of the topology of the network, and may apply path selection algorithms to select particular paths through the network.

Standby routing process 34 then generates attributes for a set of routing communications that normally result from the path selection process, e.g., routing update messages that typically are produced during the decision-making process (138). In other words, standby routing process 34 generates the attributes for the set of routing communications that primary routing process 32 would have been expected to generate during its decision-making process and previous generation of routing data 28.

Standby routing process 34 compares the attributes of the set of newly generated routing communications with the attributes of the outbound routing communications recorded in RP OUT 66 (139). If the attributes for set of routing communications are identical to the final attributes of outbound routing communications recorded in RP OUT 66 (140), then the newly generated protocol state data must be equal to or substantially similar to the original state data lost in failed primary routing control unit 20. Consequently, standby control unit 22 transitions into full operation as the primary routing controller for router 10 (144).

However, if the attributes generated by standby control unit 24 for the expected set of outbound routing communications does not equal the final attributes of the recorded set of outbound routing communications 48 in RP OUT data 66, standby control unit 22 enters a reconciliation process to fully synchronize the state of the routing protocols with the peer routers (142). Specifically, standby routing process 34 generates an incremental set of routing update messages based on the identified differences, and outputs the update messages to the peer routers. Further, standby routing process 34 may reconfigure forwarding component 12 and IFCs 11 as needed based on the differences. Upon completing the reconciliation process, standby control unit 24 assumes full routing responsibilities for router 10.

At some future point, the failed primary control unit 20 may subsequently become operational. In that event, standby control unit 24 (operating as the primary routing controller) may direct primary control unit 22 to operate in standby mode, and may configure router 10 to redirect inbound and outbound routing communications through primary control unit 22 (now operating as a standby control unit) to record the routing communications. In this manner, router 10 may readily respond to another failover event without needing to reestablish routing protocols.

One or more of the techniques described herein may be partially or wholly executed in software. For example, a computer-readable medium may store or otherwise comprise computer-readable instruction, i.e., program code that can be executed by a processor to carry out one or more of the techniques described above. For example, the computer-readable medium may comprise random access memory (RAM), read-only memory (ROM), non-volatile random access memory (NVRAM), electrically erasable programmable read-only memory (EEPROM), flash memory, magnetic or optical media, or the like.

Various embodiments of the invention have been described. For example, an exemplary embodiment has been described in which inbound and outbound routing communications are redirected through one or more standby control units for recordation. In other embodiments, the packet streams associated with these communications may be mirrored in other components. The duplicate packet streams for the inbound and outbound routing communications may, for example, be generated within the forwarding component or within the primary control unit itself, or by a component external to the routing device.

Moreover, although the techniques have been described as elements embodied within a single device, the described elements may be distributed to multiple devices. The term "system" is used herein to generally refer to embodiments of the invention in which the described elements may be embodied within a single network device or distributed within multiple devices. These and other embodiments are within the scope of the following claims.

The invention claimed is:

1. A method comprising:
   with a standby control unit of a network device, monitoring routing communications between a primary control unit of the routing device and an external routing device for a routing protocol;
   prior to failure of the primary control unit, recording the monitored routing communications with the standby control unit of the routing device;
   after recording the routing communications with the standby control unit and prior to failure of the primary control unit, processing at least a portion of the routing communications with the primary control unit of the routing device to maintain routing information within the standby control unit; and
   upon failure of the primary control unit, processing the recorded routing communications with the standby control unit to generate state information for the routing protocol, wherein the recorded communications processed by the standby control unit includes at least one of the routing communications already processed by the primary control unit.

2. The method of claim 1, further comprising executing the routing protocol on the standby control unit consistent with the generated state information without reestablishing a routing session with the external routing device.

3. The method of claim 1, further comprising redirecting the routing communications destined for the primary control unit to the standby control unit for recordation.

4. The method of claim 1, wherein monitoring routing communications comprises monitoring inbound routing communications sent from the external routing device.

5. The method of claim 4, further comprising redirecting the inbound routing communications from a forwarding component to the standby control unit prior to forwarding the inbound routing communications to the primary control unit.

6. The method of claim 5, further comprising:
   generating a duplicate packet stream from the inbound routing communications with the standby control unit;
   forwarding the inbound routing communications to the primary control unit; and
   processing the duplicate packet stream with a standby routing process executing on the standby control unit to record the inbound routing communications.

7. The method of claim 1, wherein monitoring routing communications comprises monitoring outbound routing communications sent by the primary control unit.

8. The method of claim 7, further comprising redirecting the outbound routing communications from the primary control unit to the standby control unit prior to forwarding the outbound routing communications to the external routing device.

9. The method of claim 7, further comprising:
   generating a duplicate packet stream from the outbound routing communications with the standby control unit;
   communicating the outbound routing communications to a forwarding component for forwarding to the external routing device; and
   processing the duplicate packet stream with a standby routing process executing on the standby control unit to record the outbound routing communications.

10. The method of claim 1, wherein recording the routing communications comprises maintaining a database to store a current record of attributes defined by inbound and outbound routing communications.

11. The method of claim 1, wherein processing the recorded routing communications with the standby control unit comprises:
    computing, with the standby control unit, a set of routing protocol update communications based on the recorded routing communications; and
    outputting, with the standby control unit, the set of routing protocol update communications to the external routing device to synchronize the standby routing device and the external routing device with respect to the routing protocol.

12. The method of claim 1, wherein processing the recorded routing communications with the standby control unit comprises:
    applying, with the standby control unit, at least one path selection algorithm to select paths through a network;
    computing, with the standby control unit, a set of new outbound routing communications for the routing protocol resulting from the application of the path selection algorithm;
    comparing the new outbound routing communications computed by the standby control unit to the recorded routing communications previously output by the primary control unit;

computing, with the standby control unit, a set of routing protocol update communications based on the comparison; and outputting, with the standby control unit, the set of routing protocol update communications to the external routing device to synchronize the standby routing device and the external routing device with respect to the routing protocol.

13. The method of claim 1, wherein the routing protocol comprises the Border Gateway Protocol (BGP), the Label Distribution Protocol (LDP), the Intermediate System to Intermediate System (ISIS) protocol, the Open Shortest Path First (OSPF) protocol, or the Routing Information Protocol (RIP).

14. The method of claim 1, wherein the routing device comprises a core router, an enterprise router or an access router.

15. A device comprising:
a primary control unit; and
a standby control unit that records, prior to failure of the primary control unit, routing communications exchanged between the primary control unit and an external routing device in accordance with a routing protocol,
wherein the primary control unit processes at least a portion of the routing communications to maintain routing information,
wherein the standby control unit, upon failure of the primary control unit, processes the recorded routing communications to generate state information for the routing protocol, and
wherein the recorded communications processed by the standby control unit includes at least one of the routing communications already processed by the primary control unit.

16. The device of claim 15, wherein the standby control unit processes the recorded routing communications by executing a standby routing process to processes the recorded routing communications when the primary control unit fails and generate the state information for executing the routing protocol on the standby control unit.

17. The device of claim 16, wherein the standby routing process executes the routing protocol consistent with the generated state information without reestablishing a routing session with the external routing device.

18. The device of claim 15, further comprising a redirection module that redirects the routing communications to flow through the standby control unit for recordation.

19. The device of claim 15, further comprising:
a forwarding component that forwards network packets; and
a redirection module within the forwarding component that redirects to the standby control unit inbound routing communications destined for the primary control unit.

20. The device of claim 19, wherein the standby control unit comprises a mirroring module that generates a duplicate packet stream from the inbound routing communications and forwards the inbound routing communications to the primary control unit.

21. The device of claim 20, wherein the standby control unit executes a standby routing process that processes the duplicate packet stream to record the inbound routing communications.

22. The device of claim 15, wherein the primary control unit includes a redirection module that redirects outbound routing communications generated by the primary control unit to the standby control unit.

23. The device of claim 22, wherein the standby control unit includes a mirroring module that generates a duplicate packet stream from the outbound routing communications and forwards the outbound routing communications to the primary control unit.

24. The device of claim 20, wherein the standby control unit executes a standby routing process that processes the duplicate packet stream to record the outbound routing communications.

25. The device of claim 15, wherein the standby control unit includes a database that stores a current record of attributes defined by inbound and outbound routing communications exchanged between the primary control unit and an external routing device.

26. The device of claim 15, wherein the standby control unit includes a database that stores inbound and outbound routing communications exchanged between the primary control unit and an external routing device.

27. The device of claim 15, wherein the standby control unit executes a standby routing process that computes a set of routing protocol update communications based on the recorded routing communications and outputs the set of routing protocol update communications from the standby control unit to the external routing device to synchronize the standby routing device and the external routing device with respect to the routing protocol.

28. The device of claim 27, wherein the standby routing process computes a set of new outbound routing communications for the routing protocol resulting from the application of the path selection algorithm, compares the new outbound routing communications to the recorded routing communications, and computes the set of routing protocol update communications based on the comparison.

29. The device of claim 15, wherein the routing protocol comprises the Border Gateway Protocol (BGP), the Label Distribution Protocol (LDP), the Intermediate System to Intermediate System (ISIS) protocol, the Open Shortest Path First (OSPF) protocol, or the Routing Information Protocol (RIP).

30. The device of claim 15, wherein the device comprises one of a core router, an enterprise router, and an access router.

31. A computer-readable medium comprising instructions to cause a processor within a standby control unit of a router to:
record, with the standby control unit, inbound and outbound routing communications between a primary control unit of a routing device and an external routing device for a routing protocol, wherein after recording the routing communications with the standby control unit, the primary control unit processes at least a portion of the routing communications to maintain routing information;
upon detecting failure of the primary control unit, process the recorded routing communications with the standby control unit to generate state information for executing the routing protocol on the standby control unit, wherein the recorded communications processed by the standby control unit includes at least one of the routing communications already processed by the primary control unit; and
output, with the standby control unit, a set of routing protocol update communications to the external routing device to synchronize the standby routing device and the external routing device with respect to the routing protocol.

32. The computer-readable medium of claim 31, wherein the instructions cause the processor to process the recorded routing communications with the standby control unit by:
- computing, with the standby control unit, a set of routing protocol update communications based on the recorded routing communications; and
- outputting, with the standby control unit, the set of routing protocol update communications to the external routing device to synchronize the standby routing device and the external routing device with respect to the routing protocol.

33. The computer-readable medium of claim 31, wherein the instructions cause the processor to process the recorded routing communications with the standby control unit by:
- applying, with the standby control unit, at least one path selection algorithm to select paths through a network;
- computing, with the standby control unit, a set of new outbound routing communications for the routing protocol resulting from the application of the path selection algorithm;
- comparing the new outbound routing communications computed by the standby control unit to the recorded routing communications previously output by the primary control unit;
- computing, with the standby control unit, a set of routing protocol update communications based on the comparison; and
- outputting, with the standby control unit, the set of routing protocol update communications to the external routing device to synchronize the standby routing device and the external routing device with respect to the routing protocol.

* * * * *